(12) United States Patent
Dinu

(10) Patent No.: US 10,795,504 B2
(45) Date of Patent: Oct. 6, 2020

(54) FREQUENCY HOPPING FOR A CAPACITIVE TOUCH SCREEN CONTROLLER

(71) Applicant: STMicroelectronics Asia Pacific Pte Ltd, Singapore (SG)

(72) Inventor: Leonard Liviu Dinu, Singapore (SG)

(73) Assignee: STMICROELECTROICS ASIA PACIFIC PTE LTD, Singapore (SG)

( * ) Notice: Subject to any disclaimer, the term of this patent is extended or adjusted under 35 U.S.C. 154(b) by 0 days.

(21) Appl. No.: 14/944,433

(22) Filed: Nov. 18, 2015

(65) Prior Publication Data

US 2017/0139501 A1    May 18, 2017

(51) Int. Cl.
*G06F 3/044* (2006.01)
*G06F 3/041* (2006.01)

(52) U.S. Cl.
CPC ........ *G06F 3/04182* (2019.05); *G06F 3/0446* (2019.05); *G06F 2203/04105* (2013.01)

(58) Field of Classification Search
CPC ......... G06F 3/044–0448; G06F 3/0416–04186
See application file for complete search history.

(56) References Cited

U.S. PATENT DOCUMENTS

| | | | |
|---|---|---|---|
| 8,279,180 B2 | 10/2012 | Hotelling et al. | |
| 8,294,687 B1* | 10/2012 | Ksondzyk | G06F 3/0418 178/18.01 |
| 8,874,396 B1* | 10/2014 | Olson | G06F 3/044 345/173 |
| 9,244,569 B2* | 1/2016 | Guedon | G06F 3/044 |
| 9,256,329 B1* | 2/2016 | Shen | G06F 3/0418 |
| 9,389,256 B2* | 7/2016 | Angelini | G06F 3/044 |
| 2007/0062852 A1* | 3/2007 | Zachut | A63F 3/00643 209/683 |
| 2007/0257890 A1* | 11/2007 | Hotelling | G06F 3/0418 345/173 |
| 2008/0157893 A1* | 7/2008 | Krah | G06F 3/0418 331/177 R |
| 2008/0309625 A1* | 12/2008 | Krah | G06F 3/041 345/173 |
| 2009/0315850 A1* | 12/2009 | Hotelling | G06F 3/044 345/173 |
| 2009/0315851 A1* | 12/2009 | Hotelling | G06F 3/0418 345/173 |
| 2010/0007629 A1* | 1/2010 | Chang | G06F 3/044 345/174 |
| 2010/0149125 A1* | 6/2010 | Klinghult | G06F 3/0412 345/174 |
| 2010/0149126 A1* | 6/2010 | Futter | G06F 1/3231 345/174 |
| 2010/0328262 A1* | 12/2010 | Huang | G06F 3/0416 345/174 |

(Continued)

*Primary Examiner* — Patrick F Marinelli
(74) *Attorney, Agent, or Firm* — Crowe & Dunlevy

(57) ABSTRACT

A circuit includes a force driver configured to apply a force signal to a force node associated with a mutual capacitance to be sensed. A sensing circuit receives a sense signal from a sense node associated with said mutual capacitance to be sensed. The sensing circuit operates to generate an output signal indicative of the sensed mutual capacitance. A control circuit controls generation of the force signal to alternate between at least two different frequencies and generate said output signal for each half cycle of the force signal.

15 Claims, 6 Drawing Sheets

(56) References Cited

U.S. PATENT DOCUMENTS

| | | | |
|---|---|---|---|
| 2011/0156839 A1* | 6/2011 | Martin | H03K 17/9622 333/172 |
| 2011/0234528 A1* | 9/2011 | Guedon | G06F 3/0416 345/174 |
| 2011/0242048 A1 | 10/2011 | Guedon et al. | |
| 2011/0261005 A1* | 10/2011 | Joharapurkar | G06F 3/0418 345/174 |
| 2012/0001643 A1* | 1/2012 | Ningrat | G06F 3/0418 324/613 |
| 2012/0218222 A1* | 8/2012 | Shen | G06F 3/0418 345/174 |
| 2012/0319996 A1* | 12/2012 | Hotelling | G06F 3/044 345/174 |
| 2012/0326734 A1* | 12/2012 | Cho | G06F 3/0416 324/684 |
| 2013/0015867 A1* | 1/2013 | Aras | G06F 3/044 324/684 |
| 2013/0106779 A1* | 5/2013 | Company Bosch | G06F 3/0418 345/174 |
| 2013/0234978 A1* | 9/2013 | Ksondzyk | G06F 3/044 345/174 |
| 2013/0293511 A1* | 11/2013 | Nam | G06F 3/044 345/174 |
| 2014/0022203 A1* | 1/2014 | Karpin | G06F 19/00 345/174 |
| 2014/0077823 A1* | 3/2014 | Angelini | G06F 3/044 324/658 |
| 2014/0354590 A1* | 12/2014 | Wang | G06F 3/044 345/174 |
| 2014/0362048 A1* | 12/2014 | Hotelling | G06F 3/044 345/174 |
| 2015/0077402 A1* | 3/2015 | Ye | G06F 3/0418 345/178 |
| 2015/0109212 A1* | 4/2015 | Yao | G06F 3/044 345/173 |
| 2015/0309614 A1* | 10/2015 | Waldron | G06F 3/0412 345/174 |
| 2016/0224164 A1* | 8/2016 | Huang | G06F 3/0416 |
| 2017/0090609 A1* | 3/2017 | Petrovic | G06F 3/044 |
| 2017/0139501 A1* | 5/2017 | Dinu | G06F 3/044 |

\* cited by examiner

FREQUENCY HOPPING FOR A CAPACITIVE TOUCH SCREEN CONTROLLER

TECHNICAL FIELD

The present disclosure generally relates to a capacitive touch screen controllers and, more particularly, to a frequency hopping technique for use in driving and sampling the mutual capacitance.

BACKGROUND

A touch screen is a device that can detect an object in contact with or in proximity to a display area. The display area can be covered with a touch-sensitive matrix that can detect a user's touch by way of a finger or stylus, for example. Touch screens are used in various applications such as mobile phones and other mobile devices. A touch screen may enable various types of user input, such as touch selection of items on the screen or alphanumeric input via a displayed virtual keypad. Touch screens can measure various parameters of the user's touch, such as the location, duration, etc.

One type of touch screen is a capacitive touch screen. A capacitive touch screen may include a matrix of conductive rows and columns overlaid on the display area. In mutual capacitance sensors, the mutual capacitance at the intersection of each row and column of the matrix may be sensed. A change in mutual capacitance between a row and a column may indicate that an object, such as a finger, is touching the screen or is in proximity to the screen near the region of intersection of the row and column.

Mutual capacitance sensing circuits employ a "forcing" signal that is applied to a column conductor of the capacitive touch matrix. A sensing of the coupled signal on respective row conductors is made to detect change in the mutual capacitance. Since the capacitance change caused by a finger is small, noise reduction is important in achieving satisfactory operation. One known source of noise is external noise injected from the environment. In order to achieve a high signal-to-noise ratio (SNR), this source of noise must be taken into account. The power of such external noise sources is often concentrated in a few harmonics.

One known architecture uses a capacitance-to-voltage converter followed by an accumulator and an analog-to-digital converter. During each cycle of operation, a forcing signal having a scanning frequency is applied to the capacitance (at the intersection of a row and column) to be sensed, and charge stored in the capacitance is converted to voltage by the capacitance-to-voltage converter. The voltage is accumulated in the accumulator and converted by the analog-to-digital converter to a digital value indicative of the sensed capacitance. If the scanning frequency is close to any of the noise harmonics, a large amount of noise may be introduced in the sensing operation.

In order to filter the external noise, it is known in the art to implement a frequency hopping technique which changes the scanning frequency and, more particularly, moves the scanning frequency away from the noise harmonics. The number of scanning frequencies available for frequency hopping, and their particular frequency locations, may be limited. In some cases, it is possible that all available scanning frequencies that could be selected by frequency hopping are near noise harmonics. In such a case, noise rejection is not satisfactorily achieved.

A need accordingly exists in the art for an improved frequency hopping technique that supports finer resolution selection of the scanning frequency.

SUMMARY

In an embodiment, a circuit comprises: a force driver configured to apply a force signal to a force node associated with a mutual capacitance to be sensed; a charge to voltage converter having an input coupled to receive a sense signal from a sense node associated with said mutual capacitance to be sensed, said charge to voltage converter comprising: an integrator circuit configured to integrate said sense signal; an input switch coupled between the input of the charge to voltage converter and an input of the integrator circuit; and a reset switch coupled between an output of the integrator circuit and said input of the integrator circuit; and a control circuit configured to control generation of the force signal to alternate between at least two different frequencies and generate, for each half cycle of the force signal, a first control signal for closing the input switch and a second control signal for closing the reset switch.

In an embodiment, a method comprises: applying a force signal to a force node associated with a mutual capacitance to be sensed; integrating a sense signal output from a sense node associated with said mutual capacitance to be sensed; wherein apply the force signal comprises controlling generation of the force signal to alternate between at least two different frequencies; and wherein integrating the sense signal comprises performing integration and resetting the integration within each half cycle of the force signal.

In an embodiment, a circuit comprises: a force driver configured to apply a force signal to a force node associated with a mutual capacitance to be sensed; a sensing circuit having an input coupled to receive a sense signal from a sense node associated with said mutual capacitance to be sensed, said sensing circuit configured to generate an output signal indicative of the sensed mutual capacitance; and a control circuit configured to control generation of the force signal to alternate between at least two different frequencies and generate said output signal for each half cycle of the force signal.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
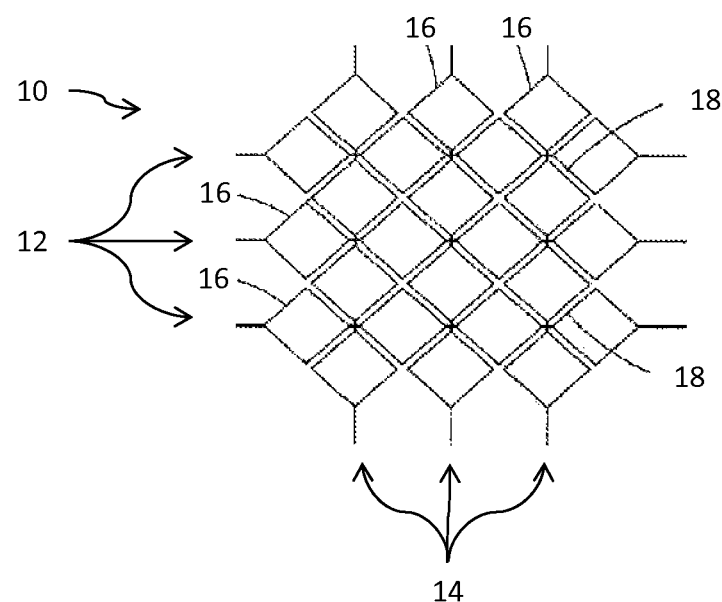
FIG. 1 illustrates a portion of a capacitive touch matrix.

The same elements have been designated with the same reference numerals in the different drawings. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed. In particular, the circuits powered by the power converter have not been detailed, the described embodiments being compatible with usual applications. In the following description, when reference is made to terms "about", "approximately", or "in the order of", this means to within 10%, preferably to within 5%.

Reference is now made to FIG. 1 showing a portion of a capacitive touch matrix 10 comprising a plurality of conductive rows 12 and plurality of conductive columns 14. Each row 12 and column 14 is formed by a plurality of serially connected diamond shaped regions 16 forming a conductive line or trace. The conductive rows 12 and the conductive columns 14 cross above or below each other at intersection points, but are not in electrical contact with one another. Because of the diamond pattern, the conductive rows 12 and the conductive columns 14 are separated from each other by capacitive gaps 18. The diamond pattern may provide decreased capacitance between conductive rows 12 and conductive columns 14. Capacitive touch matrix 10 may sense an object that modifies the fringing electric field above the capacitive gaps 18 when the object is in contact or in proximity to the matrix 10.

Figure 2:
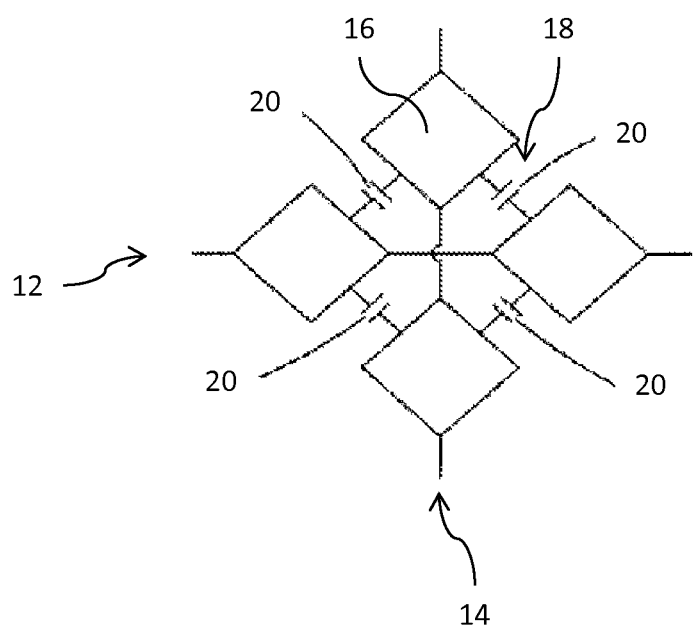
FIG. 2 illustrates a mutual capacitance intersection in the matrix.

FIG. 2 shows that when a conductive row 12 and a conductive column 14 are selected, the total capacitance of a capacitor (reference 70, FIG. 4) between row and column conductors is the sum of four capacitances 20 between the four adjacent diamond-shaped regions 16 of the selected row and column. The mutual capacitance of the capacitor between the selected row 12 and column 14 conductors can be sensed to determine whether an object is in contact with or in proximity to the matrix 10 above the region in which the four capacitances 20 are formed. Each conductive row 12 and conductive column 14 of the capacitive touch matrix 10 may be selected in succession to sense the capacitances at each intersection position of the touch matrix.

Figure 3:
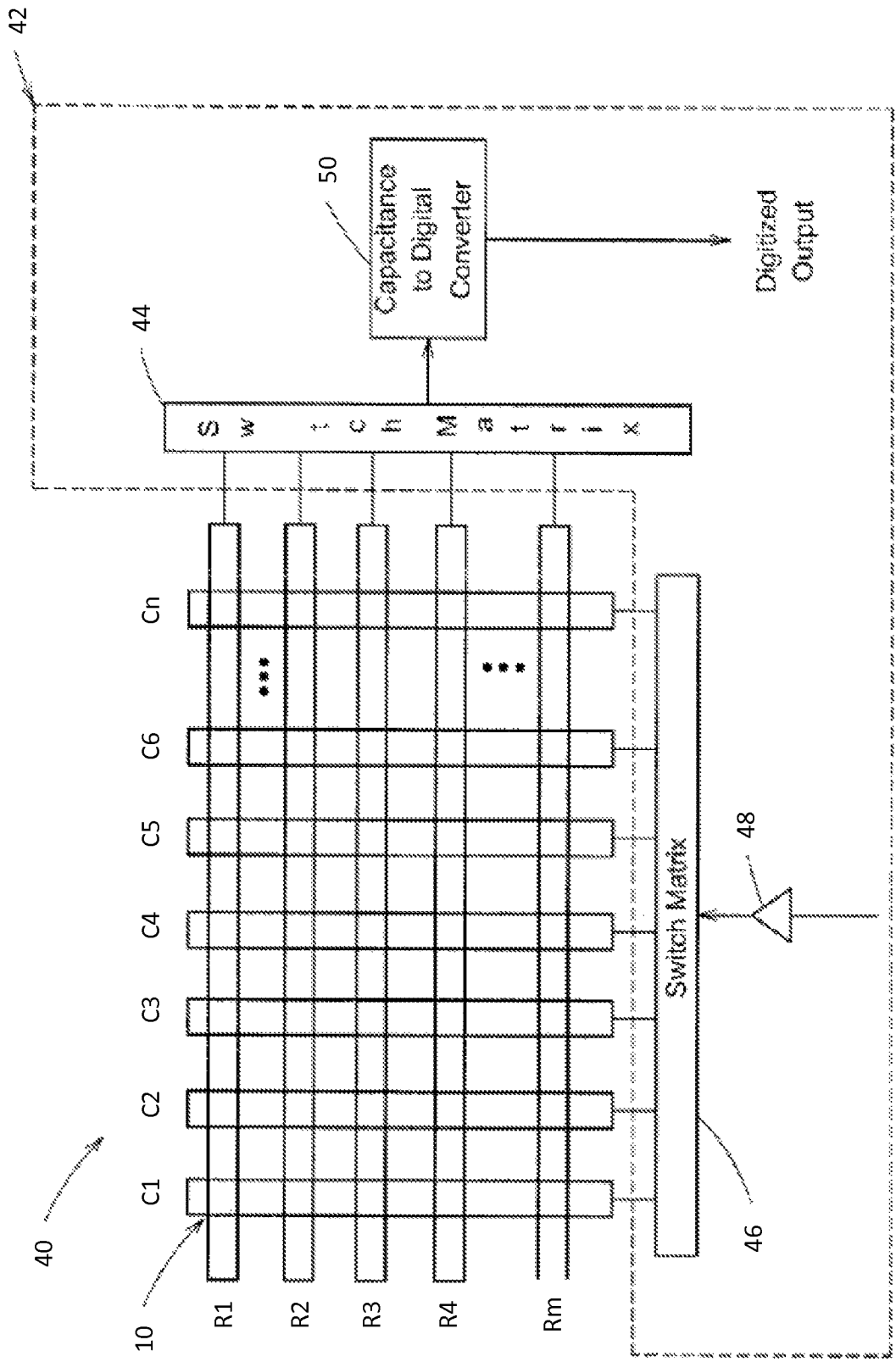
FIG. 3 is a block diagram of a touch screen system.

FIG. 3 is a block diagram of a touch screen system 40 that includes the capacitive touch matrix 10 and an associated touch screen controller 42. As discussed above, the capacitive touch matrix 10 may utilize diamond shaped regions for the row and column conductors. Such structures are not shown in FIG. 3 for reasons of clarity. Instead, the conductive rows (R1-Rm) 12 and conductive columns (C1-Cn) 14 are more simply illustrated as intersecting conductor line segments. The touch screen controller 42 includes a row switch matrix 44 and a column switch matrix 46 for selection of rows and columns of the capacitive touch matrix, such selection being made to select a particular mutual capacitance within the matrix 10 for sensing. The column switch matrix 46 receives a force signal generated by a force driver 48 and selectively applies the force signal in a sequential manner to each of the columns 14. The row switch matrix 44 sequentially selects one or more of the rows 12 for connection to a capacitance-to-digital converter circuit 50 that operates to sense charge of the mutual capacitance for the capacitors in the capacitive touch matrix 10 and convert that sensed charge to a digital value for output.

Figure 4:
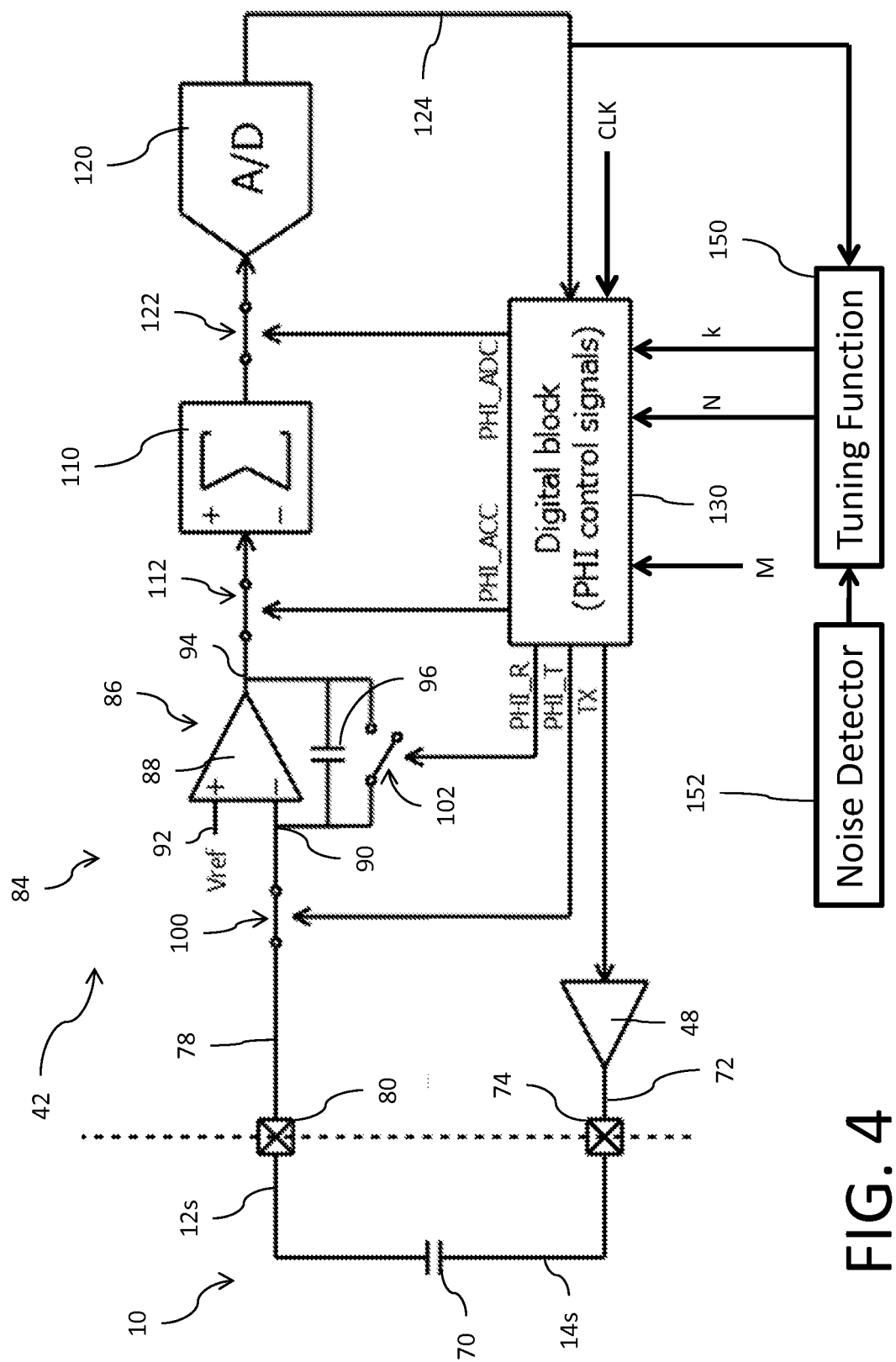
FIG. 4 illustrates details of a touch screen controller.

Reference is now made to FIG. 4 showing details of the touch screen controller 42. For simplification of the illustration, details of the row switch matrix 44 and column switch matrix 46 for selecting a particular capacitor 70 in the matrix 10 at a selected row 12s and selected column 14s are omitted. The force driver 48 receives a transmit signal TX and applies the force signal 72 to a force node 74 associated with the column 14s of the selected capacitor 70. The transmit signal TX is an alternating current (AC) signal having an adjustable frequency fadj. In an embodiment, the transmit signal TX is a square wave signal. The force signal 72 is accordingly also an AC signal, with a corresponding frequency fadj, that is coupled through the selected capacitor to generate a sense signal 78 output from a sense node 80 associated with the row 12s of the selected capacitor 70.

A charge to voltage (C2V) converter circuit 84 includes an integrator circuit 86. The integrator circuit 86 is formed by an operational amplifier 88 having a first input 90, a second input 92 and an output 94 and further includes an integrating capacitor 96 coupled between the output 94 and the first input 90. A reference voltage (Vref) is applied to the second input 92 of the operational amplifier. An input switch 100 is coupled between the sense node 80 and the first input 90 of the operational amplifier. Opening and closing of the input switch 100 is controlled by a first control signal PHI_T. A reset switch 102 is coupled between the output 94 and the first input 90 in parallel with the integrating capacitor 96. Opening and closing of the reset switch 102 is controlled by a second control signal PHI_R. The switches 100 and 102 may, for example, be implemented as transistor devices such as MOSFETs.

The C2V converter circuit 84 integrates charge from the sense signal 78 output from the sense node 80 when the first control signal PHI_T transitions to a first logic state configured to close the input switch 100. The C2V converter circuit 84 and generates a voltage at output 94 whose offset from the reference voltage Vref is indicative of the sensed mutual capacitance at capacitor 70. The first control signal PHI_T then transitions to a second logic state configured to open the input switch 100 and disconnect the C2V converter circuit 84 from the sense node 80. At this point in time, and the second control signal PHI_R transitions to a first logic state configured to close the reset switch 102 and short across the integrating capacitor 96. This results in a resetting of the C2V converter circuit 84 that drives the voltage at the output 94 to equal the reference voltage Vref.

The touch screen controller 42 further includes an analog accumulator (E) circuit 110 having an input coupled to the output 94 of the operational amplifier by a switch 112. Opening and closing of the switch 112 is controlled by a third control signal PHI_ACC. The analog accumulator circuit 110 receives the voltage generated at output 94 each time the third control signal PHI_ACC transitions to a first logic state configured to close the switch 112. The third control signal PHI_ACC is timed to close the switch 112 just before a time when the second control signal PHI_R closes the reset switch 102. Thus, the analog accumulator circuit 110 receives the integrated voltage that is indicative of the sensed mutual capacitance at capacitor 70. The voltages output from the C2V converter circuit 84 are accumulated by the analog accumulator circuit 110 over a plurality of accumulation cycles which define a sensing period. Because the C2V converter circuit 84 integrates on both the positive phase and negative phase of each cycle of the transmit signal TX, the analog accumulator circuit 110 includes both a positive (+) and negative (−) input in order to be able to accumulate properly for both phases. After the voltage has been received for accumulation, the third control signal PHI_ACC transitions to a second logic state configured to open the switch 112.

The touch screen controller 42 still further includes an analog to digital (A/D) converter circuit 120 having an input coupled to an output of the analog accumulator circuit 110 by a sample switch 122. Opening and closing of the sample switch 122 is controlled by a fourth control signal PHI_ADC. The A/D converter circuit 120 samples the accumulated voltage output from the analog accumulator circuit 110 each time the fourth control signal PHI_ADC transitions to a first logic state configured to close the switch 122. The fourth control signal PHI_ADC is timed to close the switch 122 at the end of the plurality of accumulation cycles which define the sensing period. The A/D converter circuit 120 then converts the sampled accumulated voltage and generates a corresponding digital signal 124. Once the sampling of the accumulated voltage output is completed, the fourth control signal PHI_ADC transitions to a second logic state configured to open the switch 122.

A digital circuit block 130 is configured to generate the first control signal PHI_T, second control signal PHI_R, third control signal PHI_ACC and fourth control signal PHI_ADC with the appropriate logic states and timings in order to effectuate the operations described above. The digital circuit block 130 may comprise a logic circuit. The digital circuit block 130 may, more specifically, comprise a logic circuit, programmable logic, a microcontroller or a microprocessor circuit appropriately designed or programmed to generate the control signals. The digital circuit block 130 is further configured to generate the transmit signal TX, and the timing of the first control signal PHI_T, second control signal PHI_R, third control signal PHI_ACC and fourth control signal PHI_ADC are dependent on the transmit signal TX.

To address concerns with external noise, the digital circuit block 130 generates the transmit signal TX as an alternating current (AC) signal having an adjustable frequency fadj that supports frequency hopping. By this it is meant that the digital circuit block 130 can generate the transmit signal TX to have two or more discrete frequencies. The digital circuit block 130 receives a system clock CLK having a fixed frequency fclk. The frequency fadj for the transmit signal TX is an integer fraction of the frequency fclk; for example, fadj=fclk/N, where N is an integer value. Because of this relationship, the capability to frequency hop the transmit signal TX is limited to frequencies set by the integer values of N; so, for example, fadj1=fclk/N and fadj2=fclk/(N+1) are two possible frequencies for frequency hopping selection.

Figure 5A:
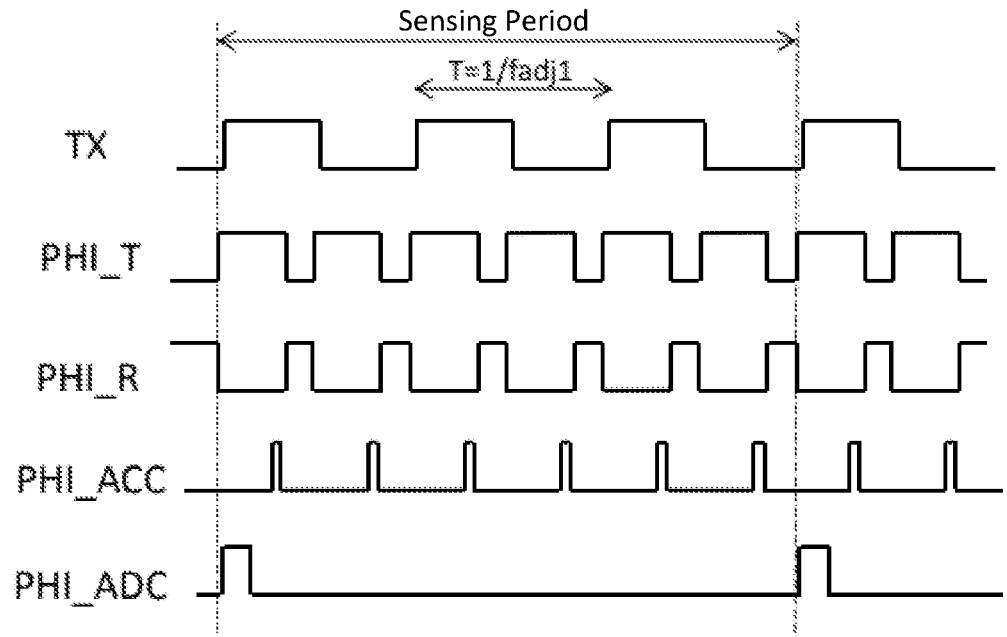
FIGS. 5A and 5B show timing relationships between transmit and integration control signals for two different scanning frequencies.
Figure 5B:
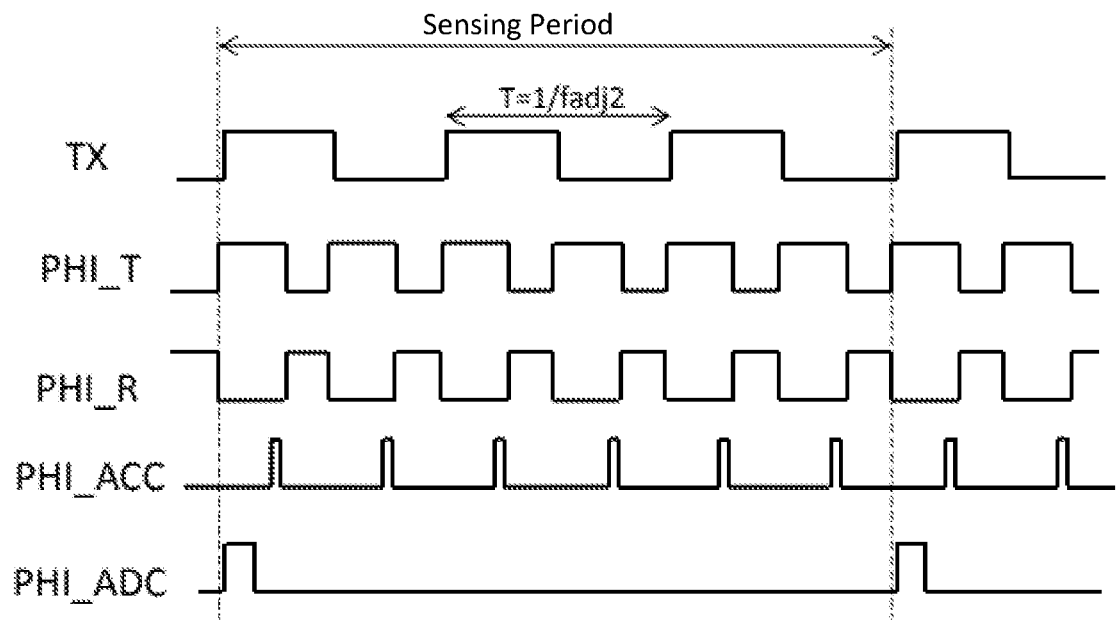

FIG. 5A shows the timing relationship between the transmit signal TX, the first control signal PHI_T and the second control signal PHI_R if the digital circuit block 130 selects the frequency fadj1 (with a period T=1/fadj1). FIG. 5B shows the timing relationship between the transmit signal TX, the first control signal PHI_T and the second control signal PHI_R if the digital circuit block 130 selects the frequency fadj2 (with a period T=1/fadj2). A sensing period 130 includes a plurality of cycles of the transmit signal TX (in this illustration, three such cycles, this being understood to be an example only). FIGS. 5A and 5B further show the timing relationships for the third control signal PHI_ACC and fourth control signal PHI_ADC.

Figure 6:
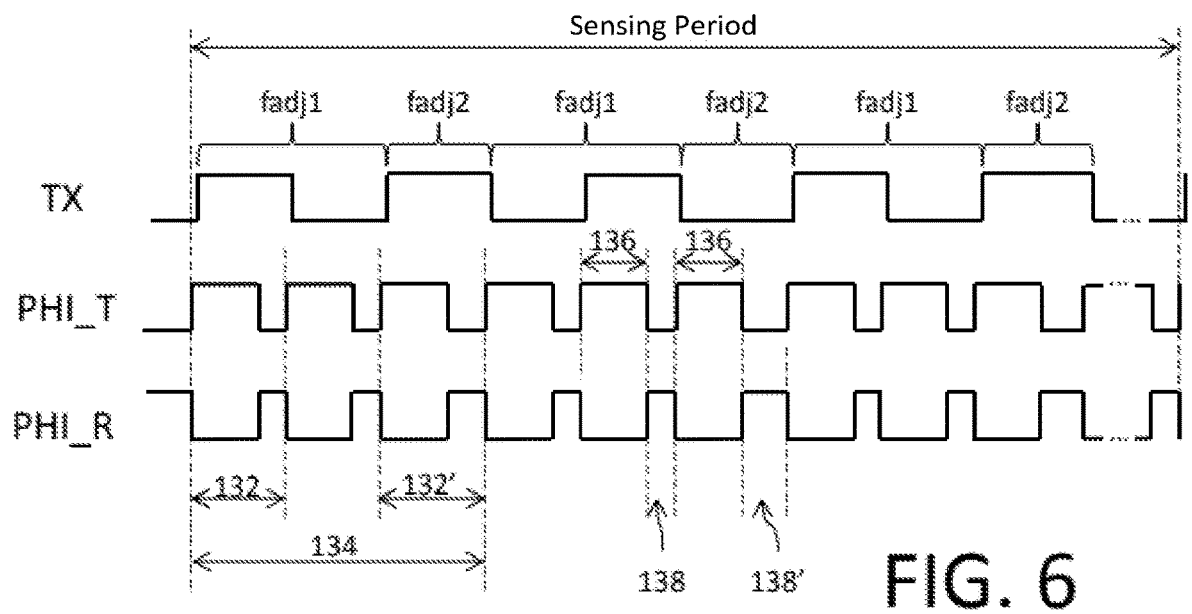
FIG. 6 shows timing relationships between transmit and integration control signals for a mixed scanning frequency.

The resolution of the frequency hopping capabilities is restricted by the integer values of N. A possibility exists, due to the harmonics associated with the external noise, that no value of N will satisfactorily produce an adjustable frequency fadj for the transmit signal TX that supports noise rejection. To address this concern, the digital circuit block 130 is configured to generate an adjustable frequency fadj for the transmit signal TX with a fractional value. This is accomplished by using two or more values of N within a single sensing period. This operation is illustrated in FIG. 6.

Each sensing period 130 includes a plurality of integration periods 132, wherein each integration period corresponds to one phase or half-cycle (positive or negative) of the TX signal. Within each integration period 132, the digital circuit block 130 asserts the first control signal PHI_T to close switch 100 and integrate the charge from the capacitor 70 and then asserts the second control signal PHI_R to close switch 102 and reset the integrator back to Vref. The length of each integration period is dependent on the adjustable frequency fadj for the transmit signal TX. To produce the fractional value of the adjustable frequency fadj, the digital circuit block 130 alternates generating the transmit signal TX between two different integer values of N with a certain repetition pattern to produce, taken over the sensing period 130, a mixed frequency fmix for the transmit signal TX. In the example shown in FIG. 6, the repetition pattern utilizes three half-cycles of the transmit signal TX with the frequency in each half-cycle set by N, N, N+1 within a pattern repetition period 134 so as to generate corresponding frequencies of fadj1, fadj1, fadj2 in the transmit signal half-cycles corresponding to the three integration periods. In this case, integration period 132' is associated with half-cycles at frequency fadj2 and integration period 132 is associated with half-cycles at frequency fadj1. The pattern repetition period 134 may be repeated as many times as desired within a given sensing period 130. This particular repetition pattern will produce a fractional mixed frequency fmix for fadj in accordance with the following equation:

$$fmix = \frac{3 * fadj1 * fadj2}{adj1 + 2 * adj2}$$

This is, of course, just an example. The pattern repetition period 134 may include any desired number of integration periods 132 and 132' with any selected number of frequencies fadj1 and fadj2. For example, the repetition pattern may instead utilize frequencies having half-cycles set by N, N+1, N+1 within the pattern repetition period 134 so as to generate corresponding frequencies of fadj1, fadj2, fadj2 in the transmit signal half-cycles corresponding to the three integration periods. This particular repetition pattern will produce a fractional mixed frequency fmix for fadj in accordance with the following equation:

$$fmix = \frac{3 * fadj1 * fadj2}{2 * fadj1 + fadj2}$$

More generically, the following equation is given:

$$fmix = \frac{M * fadj1 * fadj2}{(M - k)fadj1 + k * fadj2}$$

Where: M is the number of integration periods 132 in each pattern repetition period 134, and k is the number of integration period 132 which use the frequency fadj1. In an embodiment, k=1 and the values of M and N then set the fractional mixed frequency fmix. N may have a range of possible values (for example, N={50, 51 . . . 60}). There is a minimum value for N (depending on the time needed to fully transmit a sample and to fully reset the C2V after each transmission) and a maximum value for N (basically given by the speed requirement: larger N=>larger sampling period=>longer time to collect all the samples).

The values of M and k allow for increasing the set of N values, by adding fractions between two consecutive integer values of N (for example, {50, 50+⅛, 50+⅐ . . . 50+⁶/₇, 50+⅞, 51 . . . 59+⅞, 60}). Actually, since there is a mix of two frequencies corresponding to the periods N and (N+1), the average period is:

$$Nmix = \frac{k*N + (M-k)*(N+1)}{M} = N + \left(1 - \frac{k}{M}\right)$$

It is now clear that k/M simply increments each N. For example, if it is desired to increment in steps of ⅛, then M=8 and the value of k can be changed from 1 to 7.

The values of N and k to be used are determined by a tuning functionality 150 implementing an algorithm that is triggered for operation if a noisy condition is detected by a noise detector 152. During a tuning phase of operation, consecutive scans are performed by the tuning function 150, using different values of N and k and comparing the digital outputs from the A/D converter 120. The goal is to find the best combination of N and k which gives the least noise (measured as A/D code after the A/D conversion). The search for the optimal combination can be done by incrementing N and k (for each N, in order to sweep the interval [N,N+1]), by dichotomy (e.g. binary search) or by other custom means.

Alternatively, if the noise is pre-characterized and its harmonics are known, the best values of N and k can be predefined and stored as constants (and the tuning algorithm only searches among these values).

Although illustrated separately, it will be understood that the tuning functionality 150 may comprise a component within the digital circuit block 130.

Figure 7:
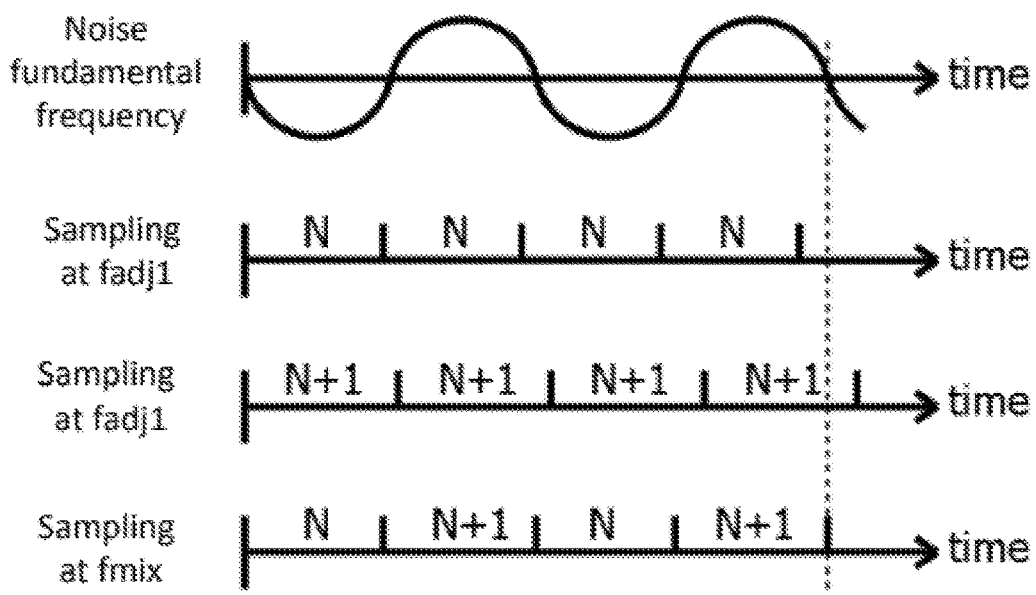
FIG. 7 illustrates a simplified example showing noise cancellation.

FIG. 7 illustrates a simplified example showing how the noise at the fundamental frequency (i.e., the highest power harmonic) is canceled by summing the samples obtained from two sub-optimal frequencies (i.e., fadj1 and fadj2). It will be noted that duration of the pattern repetition period substantially matches an integer multiple of a period of the noise fundamental frequency. This matching is accomplished by appropriate selection of the M, N and k values. In this example, the repetition pattern utilizes N, N+1 within the pattern repetition period 134 so as to generate corresponding frequencies of fadj1, fadj2; this particular repetition pattern producing a fractional mixed frequency fmix in accordance with the following equation:

$$fmix = \frac{2*fadj1*fadj2}{fadj1 + fadj2}$$

Although only two different frequencies (fadj1 and fadj2) are used in the examples presented above, it will be understood that this is by way of example only. The digital circuit block 130 may provide a repetition pattern that utilizes more than two different frequencies.

With reference once again to FIG. 6, in a preferred embodiment, the digital circuit block 130 uses a same length 136 asserted pulse for the first control signal PHI_T to close switch 100 regardless of the adjustable frequency fadj of the TX signal, but changes the length 138, 138' of the asserted pulse for the second control signal PHI_R to close switch 102 dependent on the adjustable frequency fadj of the TX signal. This is by example only, it being understood that any suitable control may be exercised over the relative lengths of the asserted pulses for the first control signal PHI_T and the second control signal PHI_R so long as the asserted pulses do not overlap and the total length of the asserted pulses substantially equals the length of one phase (positive, negative) of the TX signal. In one embodiment, the second control signal PHI_R is a logical inversion of the first control signal PHI_T. There may be an advantage to fixing the length 136 of the asserted pulse for the first control signal PHI_T in order to ensure a sufficient and regulated integration time. The lengths 138, 138' of the asserted pulse for the second control signal PHI_R must be sufficient to ensure that the integrator is reset to Vref. Appropriate limits may be programmed into the digital circuit block 130 to ensure proper asserted pulse lengths.

The following advantages of the solution described above are noted: a) more frequencies are made available for selection by the frequency hopping algorithm implemented by the digital circuit block 130; b) this allows for a finer resolution when choosing an optimal scanning frequency (having the lowest noise power); c) availability and selection of such a scanning frequency (not available through selection of one value of N) allows for a much higher rejection of external noise; and d) external noise focused at a certain harmonic frequency can be completely or almost completely canceled due to the availability of the fractional mixed frequency.

Figure 8:
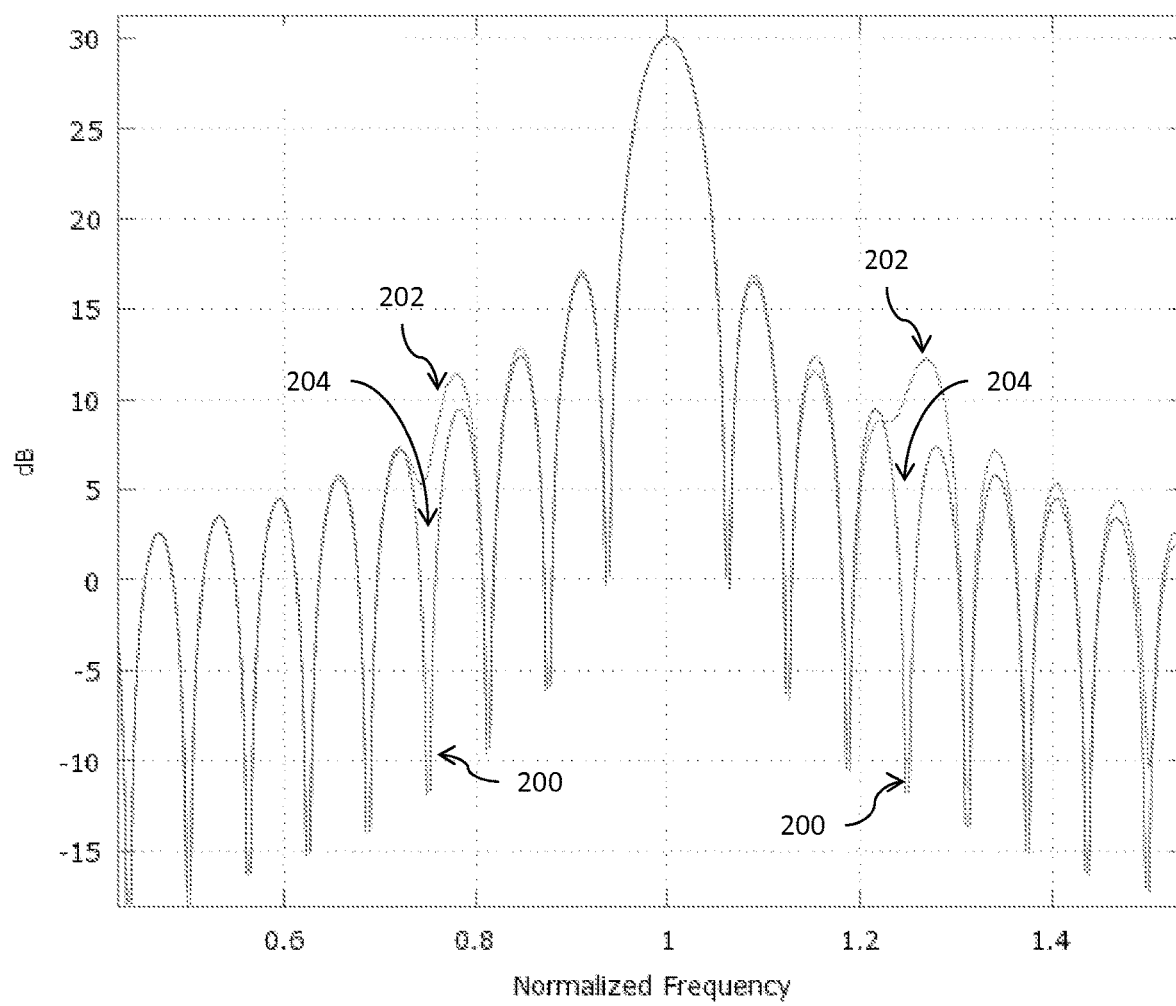
FIG. 8 is a normalized power spectrum plot.

FIG. 8 is a normalized power spectrum plot showing at reference 200 the spectrum for an ideal frequency fmixi=fclk/(N+0.5) and showing at reference 202 the spectrum for the fractional mixed frequency fmix obtained by mixing fclk/N and fclk/(N+1) as described above. The two power spectra advantageously substantially match each other except at some distortion locations 204 where the fractional mixed frequency fmix lacks notches present in the ideal frequency fmixi. The goal is to find an intermediate adjustable scanning frequency fadj for the signal TX such that the fundamental frequency of the noise falls within a notch of the power spectrum for the scanning frequency fadj. Because of the distortion locations 204, care must be taken in selecting the fractional mixed frequency fmix to ensure that the noise frequency is present in the notch.

Various embodiments have been described. Various alterations, modifications, and improvements will readily occur to those skilled in the art. Further, the practical implementation of the embodiments which have been described is within the abilities of those skilled in the art based on the functional indications given hereabove.

The invention claimed is:

1. A circuit, comprising:
 a force driver configured to apply a force signal to a force node associated with a mutual capacitance;
 a sensing circuit having an input coupled to receive a sense signal from a sense node associated with said mutual capacitance, said sensing circuit configured to generate an output signal indicative of the sensed mutual capacitance; and
 a control circuit configured to control the generation of the force signal to alternate between at least two different frequencies;
 wherein said sensing circuit is configured to generate said output signal for each half cycle of the force signal;
 wherein a plurality of consecutive half-cycles of the force signal define a pattern repetition period within which the use of said at least two different frequencies is defined by a frequency pattern specifying one of the at least two different frequencies for each of the plurality of consecutive half-cycles of the force signal.

2. The circuit of claim 1, wherein said sensing circuit comprises a charge to voltage converter circuit.

3. The circuit of claim 1, further comprising an analog accumulator circuit configured to accumulate said output signal over a time period.

4. The circuit of claim 1, further comprising an analog to digital converter circuit configured to convert said output signal to a digital signal.

5. The circuit of claim 1, wherein a duration of the pattern repetition period matches an integer multiple of a fundamental frequency of external noise.

6. The circuit of claim 1, wherein a sensing period for sensing the mutual capacitance includes a plurality of pattern repetition periods.

7. The circuit of claim 2, wherein said charge to voltage converter circuit comprises:
- an integrator circuit configured to integrate said sense signal;
- an input switch coupled between the input of the charge to voltage converter circuit and an input of the integrator circuit; and
- a reset switch coupled between an output belonging to the integrator circuit and said input of the integrator circuit; and
- wherein said control circuit is configured to generate, for said each half cycle of the force signal, a first control signal for closing the input switch and a second control signal for closing the reset switch.

8. The circuit of claim 7, wherein a duration of the pattern repetition period matches an integer multiple of a fundamental frequency of external noise.

9. The circuit of claim 7, wherein the pattern repetition period includes a number M half cycles with a number k half-cycles at a first one of the at least two different frequencies and a number M-k half-cycles at a second one of the at least two different frequencies.

10. The circuit of claim 7, wherein a sensing period for sensing the mutual capacitance includes a plurality of pattern repetition periods, each of the plurality of pattern repetition periods being defined by the plurality of consecutive half-cycles of the force signal.

11. The circuit of claim 10, further comprising an analog accumulator circuit configured to accumulate voltages at an output belonging to the charge to voltage converter over the sensing period.

12. The circuit of claim 11, further comprising an analog to digital converter circuit configured to convert an output belonging to the analog accumulator circuit to an output digital value indicative of the sensed mutual capacitance.

13. The circuit of claim 7, further comprising an analog accumulator circuit configured to accumulate voltages at an output belonging to the charge to voltage converter over the pattern repetition period.

14. The circuit of claim 13, further comprising an analog to digital converter circuit configured to convert an output belonging to the analog accumulator circuit to an output digital value indicative of the sensed mutual capacitance.

15. The circuit of claim 7, wherein the first control signal for closing the input switch has a pulse with a fixed duration for each half cycle of the force signal, and wherein the second control signal for closing the reset switch has a pulse with a variable duration in each half cycle of the force signal that is dependent on the at least two different frequencies.

* * * * *

UNITED STATES PATENT AND TRADEMARK OFFICE
CERTIFICATE OF CORRECTION

| | |
|---|---|
| PATENT NO. | : 10,795,504 B2 |
| APPLICATION NO. | : 14/944433 |
| DATED | : October 6, 2020 |
| INVENTOR(S) | : Leonard Liviu Dinu |

It is certified that error appears in the above-identified patent and that said Letters Patent is hereby corrected as shown below:

In the Specification

At Column 4, Line 45, please replace the term [[ (E) ]] with -- ($\Sigma$) --.

At Column 6, Line 3, please replace [[ period.]] with -- period 130. --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*